United States Patent
Pepperling et al.

(10) Patent No.: US 7,150,194 B2
(45) Date of Patent: Dec. 19, 2006

(54) GAUGE PRESSURE SENSOR FOR HAZARDOUS APPLICATIONS

(75) Inventors: Donald Paul Pepperling, Marshalltown, IA (US); Dennis Gene Sickels, Marshalltown, IA (US); Richard J. Vanderah, Marshalltown, IA (US)

(73) Assignee: Fisher Controls International, LLC, St. Louis, MO (US)

( * ) Notice: Subject to any disclaimer, the term of this patent is extended or adjusted under 35 U.S.C. 154(b) by 47 days.

(21) Appl. No.: 10/770,066

(22) Filed: Feb. 2, 2004

(65) Prior Publication Data
US 2004/0177696 A1    Sep. 16, 2004

Related U.S. Application Data

(62) Division of application No. 10/386,697, filed on Mar. 13, 2003, now Pat. No. 6,854,230.

(51) Int. Cl.
*G01L 7/00* (2006.01)
(52) U.S. Cl. ............................................ 73/706
(58) Field of Classification Search ............... 73/700, 73/706
See application file for complete search history.

(56) References Cited

U.S. PATENT DOCUMENTS

| | | | |
|---|---|---|---|
| 4,563,902 A | 1/1986 | Kohnlechner | 73/708 |
| 4,970,898 A | 11/1990 | Walish et al. | 73/706 |
| 5,287,746 A * | 2/1994 | Broden | 73/706 |
| 5,439,021 A * | 8/1995 | Burlage et al. | 137/84 |
| 5,524,492 A * | 6/1996 | Frick et al. | 73/706 |
| 5,948,988 A | 9/1999 | Bodin | 73/706 |

FOREIGN PATENT DOCUMENTS

| | | | |
|---|---|---|---|
| JP | 60080749 | | 5/1985 |
| WO | WO2004/088267 | * | 10/2004 |

* cited by examiner

*Primary Examiner*—Edward Lefkowitz
*Assistant Examiner*—Andre Allen
(74) *Attorney, Agent, or Firm*—Hanley, Flight & Zimmerman LLC

(57) ABSTRACT

Methods and apparatus for sensing a gauge pressure use a pressure gauge pressure sensor that includes a housing and a gauge pressure sensing element having a first pressure inlet and a second pressure inlet. The first pressure inlet is associated with a pressure to be measured and the second pressure inlet is associated with an atmospheric pressure. A flame arrestor disposed within the sensor housing fluidly couples the second pressure inlet to an internal portion of an explosion proof device.

3 Claims, 2 Drawing Sheets

GAUGE PRESSURE SENSOR FOR HAZARDOUS APPLICATIONS

RELATED APPLICATION

This application is a divisional of U.S. patent application No. 10/386,697 filed on Mar. 13, 2003 now U.S. Pat. No. 6,854,230.

FIELD OF THE DISCLOSURE

The present disclosure relates generally to pressure sensors and, more specifically, to pressure sensors for use in hazardous applications.

BACKGROUND

Pressure sensors are commonly used to monitor and/or control the pressure and flow of process fluids such as, for example, oil, water, gases, etc. In many cases, the pressure sensors are integral to a fluid flow regulator that is serially interposed in the process fluid flow path. In other cases, the pressure sensors are integral to a monitoring device that does not perform a regulation function and that is appended to or serially interposed in the process fluid flow path. For example, the RegFlo™ family of flow monitoring devices provided by Fisher Controls International, Inc. (and in particular the RF100 series flow monitoring devices) may include an inlet pressure sensor, an outlet pressure sensor and an auxiliary pressure sensor, all of which may be integrally attached via a threaded engagement.

For some industrial applications such as, for example, the distribution of combustible process fluids (e.g., combustible gases), explosion proof or flame proof rated regulators, sensing devices, etc. are required. In the case of a regulator, combustible process fluids that accumulate in the regulator housing must be properly vented to ambient or atmosphere to achieve a flame proof or explosion proof rating. Generally, atmospheric venting is configured to prevent the dangerous accumulation of combustible process fluids within the regulator housing and to prevent a combustion process that initiates within the regulator housing from propagating to the greater process ambient surrounding the regulator. For example, one or more sintered metal flame arrestors (which are semi-porous and provide a sufficiently minimal flame path) may be used to provide the necessary atmospheric venting.

Known explosion proof and flame proof flow regulators, monitors, etc. are typically configured to use one or more absolute pressure sensors that do not require venting to atmosphere. As is known, absolute pressure sensors usually include a diaphragm that deflects in proportion to the pressure difference across opposing faces of the diaphragm. In the case of an absolute pressure sensor, a reference face or side of the diaphragm is exposed to a sealed chamber while the other side or face of the diaphragm is exposed to the pressure exerted by the process fluid being measured. Because the reference face or side of an absolute pressure sensor diaphragm does not have to be vented to atmosphere, it is a relatively simple matter to attach such a sensor to a regulator or monitor housing without compromising the explosion proof or flame proof rating of the regulator or monitor.

Unfortunately, absolute pressure sensors are not ideally suited for use in applications that require the measurement of low pressure process fluids such as, for example, natural gas distribution applications. In particular, because the reference side or face of the diaphragm is sealed at about atmospheric pressure, absolute pressure sensors are typically only capable of accurately sensing pressures that are well above one atmosphere (i.e., about 15 pounds per square inch absolute).

On the other hand, gauge pressure sensors are better suited to accurately measure relatively low pressures. However, the reference face or side of the diaphragm within a gauge pressure sensor must be vented to atmosphere. As a result, it is not a simple matter to substitute gauge pressure sensors for the absolute pressure sensors that are typically used with explosion proof or flame proof regulators and monitors without compromising the explosion proof or flame proof rating of these devices.

In addition, gauge pressure sensors are typically vented to atmosphere via a small opening in the sensor housing that is exposed to the ambient surrounding the sensor and the regulator or monitor with which it is associated. As a result, gauge pressure sensors typically cannot be used in regulator and/or monitor applications that result in submersion of the regulator and/or monitor in a liquid (e.g., water). For example, many underground applications may involve periodic or continuous submersion of a regulator (and the devices such as sensors and the like attached thereto) in water.

SUMMARY

In accordance with one aspect, a pressure sensor may include a housing and a gauge pressure sensing element having a first pressure inlet and a second pressure inlet. Additionally, the first pressure inlet may be associated with a pressure to be measured and the second pressure inlet may be associated with an atmospheric pressure. Also, the pressure sensor may include a flame arrestor disposed within the housing and fluidly coupled to the second pressure inlet.

In accordance with another aspect, an explosion proof device may include a housing having a first flame arrestor that vents an inner chamber of the housing to an atmospheric pressure. The explosion proof device may also include a pressure sensor assembly having a second flame arrestor and a gauge pressure sensing element having first and second pressure inputs. The first pressure input may be fluidly coupled to a port configured to accept a process fluid and the second pressure input may be fluidly coupled to the second flame arrestor. In addition, the second flame arrestor may be fluidly coupled to the inner chamber.

In accordance with yet another aspect, a flame arrestor for use in a gauge pressure sensor may include a cylindrical body portion having a passage therethrough and configured to be disposed within a gauge pressure sensor assembly. The flame arrestor may also include a plurality of flame proof electrical connections that traverse the passage and that are adapted to carry at least one electrical signal associated with a pressure sensing element within the gauge pressure sensor.

DETAILED DESCRIPTION

Figure 1:
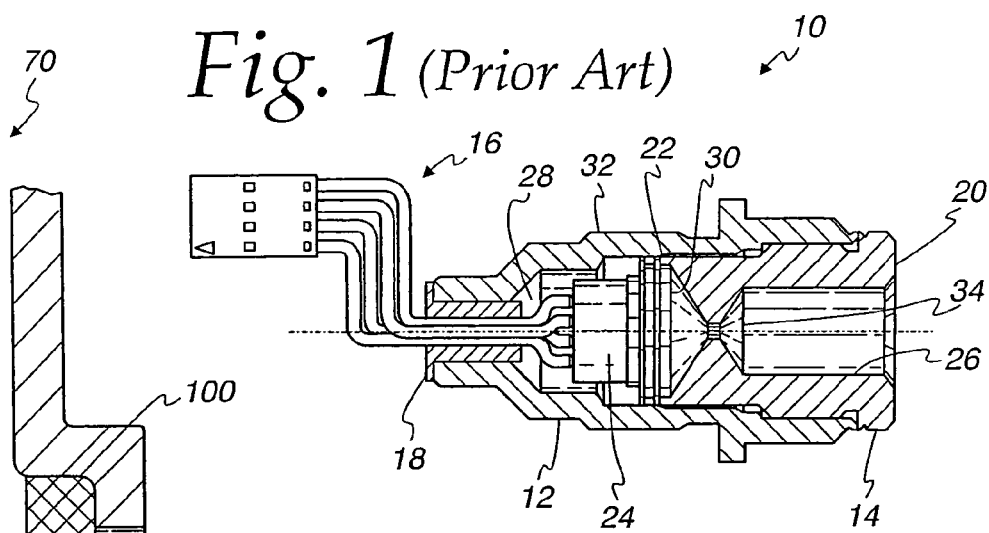
FIG. 1 is a sectional view of a known absolute pressure sensor assembly that may be used with explosion proof devices.

FIG. 1 is a sectional view of a known absolute pressure sensor assembly 10 that may be used with explosion proof devices. As shown in FIG. 1, the pressure sensor assembly 10 includes a cylindrical sensor housing 12, a sensor sub-assembly 14, a plurality of electrical connections 16 that convey electrical signals to/from the sensor sub-assembly 14 and a grommet or strain relief plug 18 that provides strain relief for the electrical connections 16 as they exit the sensor housing 12. Additionally, the strain relief plug 18 may be used to form a seal that prevents the ingress or egress of process fluids and/or other contaminants into or out of the sensor housing 12.

The sensor sub-assembly 14 includes an input port or adapter 20, an o-ring or other circumferential seal 22 and a pressure sensing element 24. The input port or adapter 20 may be threaded or pressed into the housing 12 and may include internal threads 26 for connecting the sensor assembly 10 to a process fluid. The input port or adapter 20 is configured to communicate or convey a pressure associated with the process fluid to the pressure sensing element 24. The o-ring or other circumferential seal 22 is configured to prevent process fluids from bypassing the pressure sensing element 24 and thereby entering (or contaminating) a lower portion 28 of the sensor housing 12 and/or from contaminating a device to which the sensor assembly 10 is mounted.

The pressure sensing element 24 may be a silicon-based absolute pressure sensor having a diaphragm that deflects or that is otherwise responsive to a pressure difference across opposing faces of the diaphragm. More specifically, the pressure sensing element 24 may provide a variable resistance and/or capacitance output in response to pressure variations across first and second faces 30 and 32 of the pressure sensing element 24. In particular, as depicted in FIG. 1, the first face 30 of the pressure sensing element 24 is exposed to the process fluid via a passage 34. Although not shown, the second face 32 of the pressure sensing element 24 is exposed to a sealed internal chamber that is pressurized to about one atmosphere. Thus, as the pressure associated with the process fluid varies above one atmosphere of pressure, a resistance and/or capacitance associated with the pressure sensing element 24 varies and may be sensed via the electrical connections 16.

Figure 2:
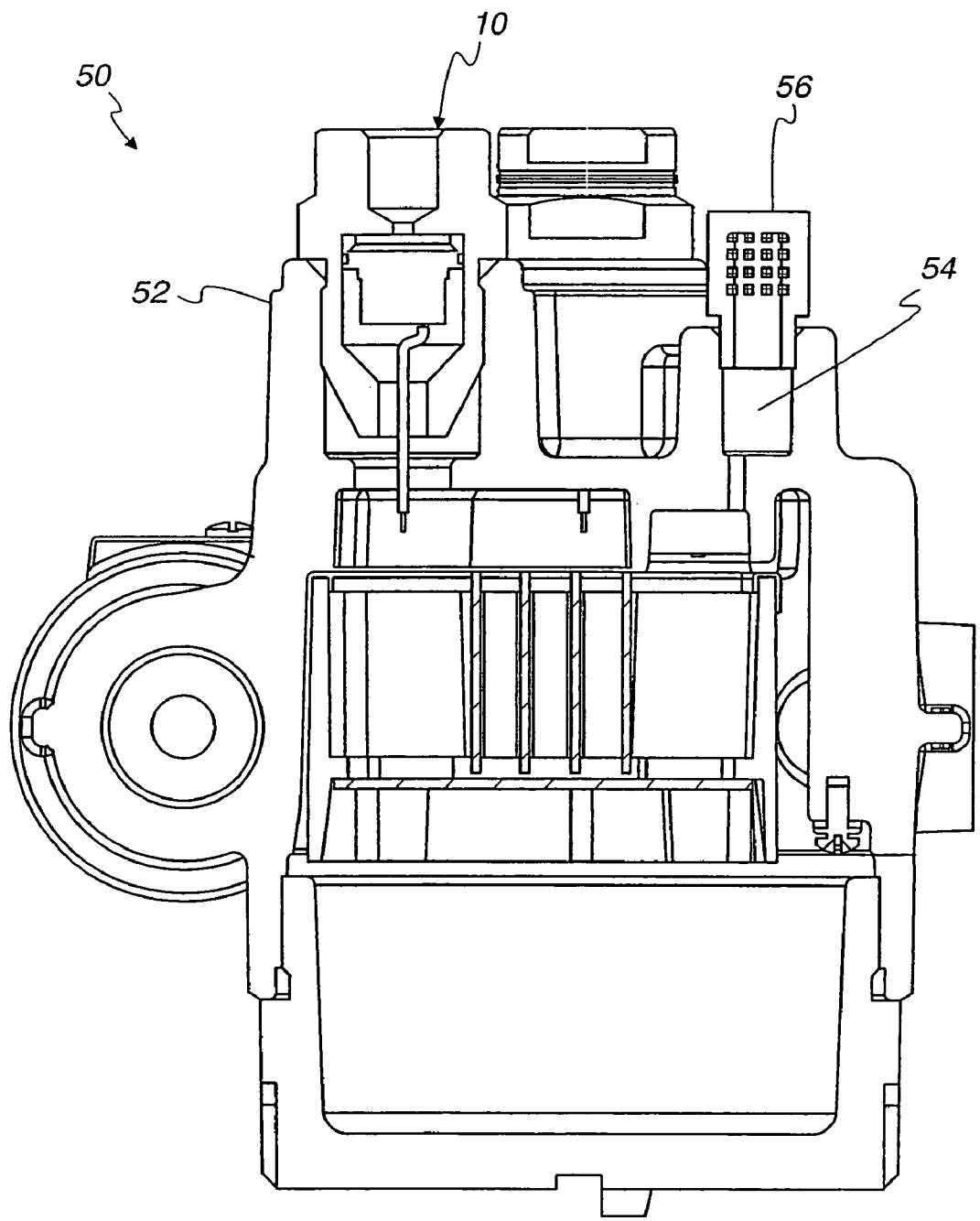
FIG. 2 is a sectional view of a known explosion proof assembly having the absolute pressure sensor assembly shown in FIG. 1 mounted thereto.

FIG. 2 is a sectional view of a known explosion proof assembly 50 having the absolute pressure sensor assembly 10 shown in FIG. 1 mounted thereto. The explosion proof assembly 50 shown in FIG. 2 may be process fluid flow regulator and/or monitoring device that regulates and/or monitors the pressure and/or flow of a potentially explosive process fluid. The absolute pressure sensor assembly 10 is mounted to a housing portion 52 of the explosion proof assembly 50. In addition, to achieve an explosion proof rating, the housing portion 52 is sealed with respect to its surrounding ambient and is vented through a flame arrestor 54 and an atmospheric vent or opening 56. In this manner, the combustion of any process fluids that accumulate within the housing portion 52 is prevented from propagating to the greater environment or ambient surrounding the explosion proof assembly 50.

Because the pressure sensor assembly 10 is configured to detect or sense absolute pressure, the pressure sensor assembly 10 is sealed with respect to the housing portion 52 and, thus, potentially explosive process fluids do not accumulate within the pressure sensor assembly 10.

Figure 3:
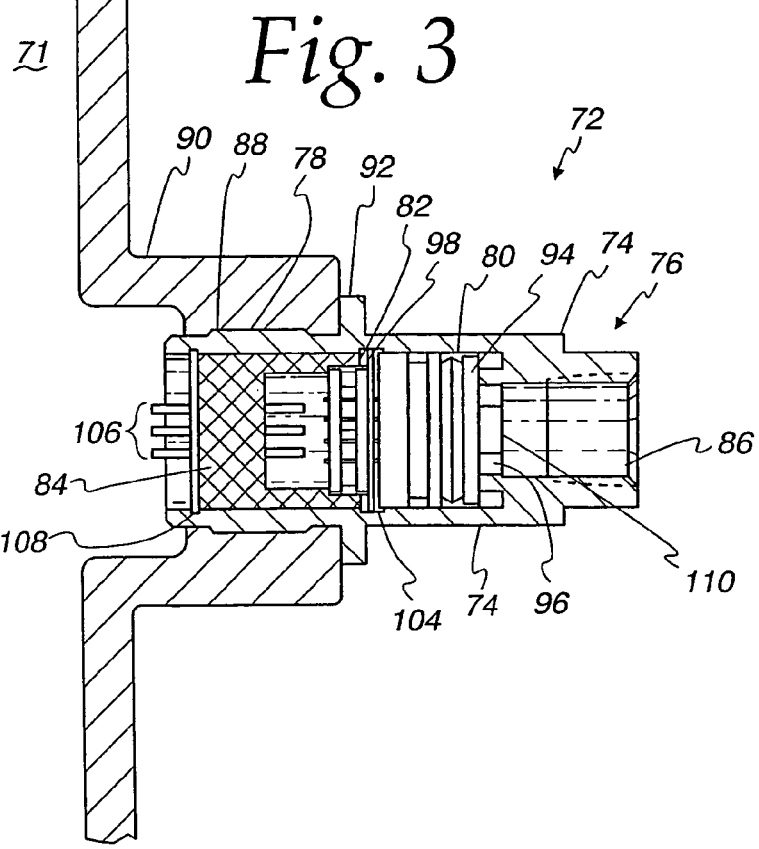
FIG. 3 is a sectional view of an example explosion proof assembly having an example gauge pressure sensor assembly mounted thereto.

FIG. 3 is a sectional view of an example explosion proof assembly 70 having an inner chamber 71 and an example gauge pressure sensor assembly 72 attached thereto. The example gauge pressure sensor assembly 72 includes a housing 74 having an input portion 76 and an attachment portion 78, a gauge pressure sensing element 80, a printed circuit assembly 82 and a flame arrestor 84.

The input portion 76 of the housing 74 may include an internally threaded portion 86 that is configured to accommodate a ¼ inch National Pipe Thread connection to a process fluid. However, other connection mechanisms or connector configurations could be used instead. For example, the input portion 76 of the housing 74 may provide a barbed fitting for use with flexible rubber or plastic tubing, a compression fitting for use with metal tubing and/or connectors, or any other desired coupling designed for use with process fluids.

The attachment portion 78 of the housing 74 is generally cylindrically shaped and includes external threads 88 that enable the gauge pressure sensor assembly 72 to be threaded into an explosion proof housing 90, which may be associated with an explosion proof device such as, for example, a flow regulator and/or monitor for use with natural gas. Of course, the attachment portion 78 does not necessarily have to provide a threaded engagement and the sensor assembly 72 could be attached to the explosion proof housing 90 in other manners. For example, the attachment portion 78 could be configured for a press-fit, which may, if desired, include a crimp, stab-in, or other mechanical deformation of the housing 90 and/or the sensor housing 74 to fix the sensor assembly 72 to the explosion proof housing 90. Alternatively or additionally, adhesives, welding, etc. may be used to fix the sensor assembly 72 to the explosion proof housing 90. In any case, the attachment portion 78 of the sensor housing 74 is preferably configured to mate with the explosion proof housing 90 to meet Canadian Standards Association (CSA) flame path requirements, which may, for example, require a maximum gap of 0.1 millimeter between the attachment portion 78 and the explosion proof housing 90.

The sensor assembly housing 74 may also include a shoulder portion, collar or flange 92 that provides a mechanical stop against which the sensor assembly 72 can be tightened to the explosion proof housing 90. The shoulder portion 92 may also function to deform or otherwise seal against the explosion proof housing 90 to enable compliance with CSA flame path requirements.

The gauge pressure sensing element 80 may be any desired gauge pressure sensing device including, for example, devices that are silicon-based and which use a variable resistance and/or capacitance output to detect the deflection of a diaphragm in response to variations in pressure. In particular, a first pressure inlet, face or side 94 of the sensing element 80 is exposed via openings 96 to a pressure associated with a process fluid. Additionally, a second pressure inlet, face or side 98 of the pressure sensing element 80 is exposed to the internal pressure of the explosion proof housing 90, which is maintained at atmospheric ambient pressure via a second flame arrestor 100 and a vent 102. The pressure sensing element 80 may have electrical leads that are soldered directly to the printed circuit assembly 82 and a retaining mechanism 104 such as for example, a retaining ring, wave washer or spring, etc. may be used to retain the printed circuit assembly 82 and the pressure sensing element 80 within the housing 74 as shown. Preferably, the pressure sensing element is a 0-3 pounds per square inch sensor when the pressure sensor assembly 72 is used in applications requiring the control and/or monitoring of relatively low pressures such as in natural gas distribution applications.

The flame arrestor 84 is preferably, but not necessarily, cylindrically shaped and made of a sintered metal. However, other shapes and/or or materials could be used instead. The flame arrestor 84 is sized and configured to meet CSA flame path requirements (e.g., less than 0.1 millimeter gap along the length of the joint between the flame arrestor 84 and the housing 74. A plurality of flame proof electrical connections 106 pass through the flame arrestor 84 to enable electrical signals to be conveyed to/from the pressure sensing element 80. Preferably, but not necessarily, the electrical connections 106 pass through one or more openings or passages (not shown) in the flame arrestor 84 that may be glassed-in using any desired technique to achieve a flame proof rating. A second retaining ring 108 or other device may be used to fix or retain the flame arrestor 84 within the housing 74 as shown in FIG. 3.

As is also depicted in FIG. 3, a back up or back stop 110 may be provided to provide overpressure protection in the event an explosion occurs within the housing 90. The back up 110 is preferably sized and configured to enable a diaphragm within the pressure sensing element 80 to withstand (i.e., to not punch through when subjected to) at least four times the rated explosion pressure of the housing 90.

Thus, the example gauge pressure sensor assembly 72 depicted in FIG. 3 is fluidly coupled to a first pressure associated with a process fluid via, for example, the input portion 76 of the housing 74. Additionally, the gauge pressure sensor assembly 72 is fluidly coupled to atmospheric pressure via the flame arrestor 84, the sensor housing 90 and a second flame arrestor 100 and vent 102 associated with the housing 90. In this manner, a plurality of gauge pressure sensor assemblies such as that shown in FIG. 3 may be vented to atmospheric pressure through an explosion proof housing to which they are mounted and through a common explosion proof housing vent such as that provided by the second flame arrestor 100 and vent 102. Such a common venting arrangement may be particularly beneficial in applications requiring the explosion proof housing 90 to be submerged because only the common vent needs to be extended above the surface of the liquid in which the housing is submerged.

Although certain methods and apparatus have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A flame arrestor for use in a gauge pressure sensor, comprising:
   a cylindrical body portion defining an inner and outer surface such that the inner surface is operatively coupled to an explosion proof assembly and the outer surface is operatively coupled to an environment substantially isolated from the explosion proof assembly, the cylindrical body portion providing a plurality of passages connecting the inner and outer surfaces; and
   a plurality of flame proof electrical connections such that each electrical connection traverses a corresponding passage from the inner surface to the outer surface and being adapted to carry at least one electrical signal associated with a pressure sensing element within the gauge pressure sensor.

2. A flame arrestor as defined in claim 1, wherein the cylindrical body portion is made of a sintered metal material.

3. A flame arrestor as defined in claim 1, wherein the plurality of flame proof electrical connections are glassed-in.

* * * * *

UNITED STATES PATENT AND TRADEMARK OFFICE
CERTIFICATE OF CORRECTION

| | |
|---|---|
| PATENT NO. | : 7,150,194 B2 |
| APPLICATION NO. | : 10/770066 |
| DATED | : December 19, 2006 |
| INVENTOR(S) | : Pepperling et al. |

It is certified that error appears in the above-identified patent and that said Letters Patent is hereby corrected as shown below:

On the Title Page under item [62]: Heading "Related U.S. Patent Application Data"
    after "Ser. No." delete "10/386,697" and insert -- 10/368,697 --.
    after "filed on" delete "Mar. 13, 2003" and insert -- Feb. 19, 2003 --.
    after "Pat. No." delete "6,854,230" and insert -- 6,715,360 --.

Col. 1, line 7
    after "application No." delete "10/386,697" and insert -- 10/368,697 --.
    after "filed on" delete "Mar. 13, 2003" and insert -- Feb. 19, 2003 --.

Col. 1, line 8
    after "Pat. No." delete "6,854,230" and insert -- 6,715,360 --.

Signed and Sealed this

Twenty-first Day of April, 2009

JOHN DOLL
*Acting Director of the United States Patent and Trademark Office*